JOHN MILLS.
Improvement in Throttle Valve Levers for Locomotives.
No. 124,606.  Patented March 12, 1872.
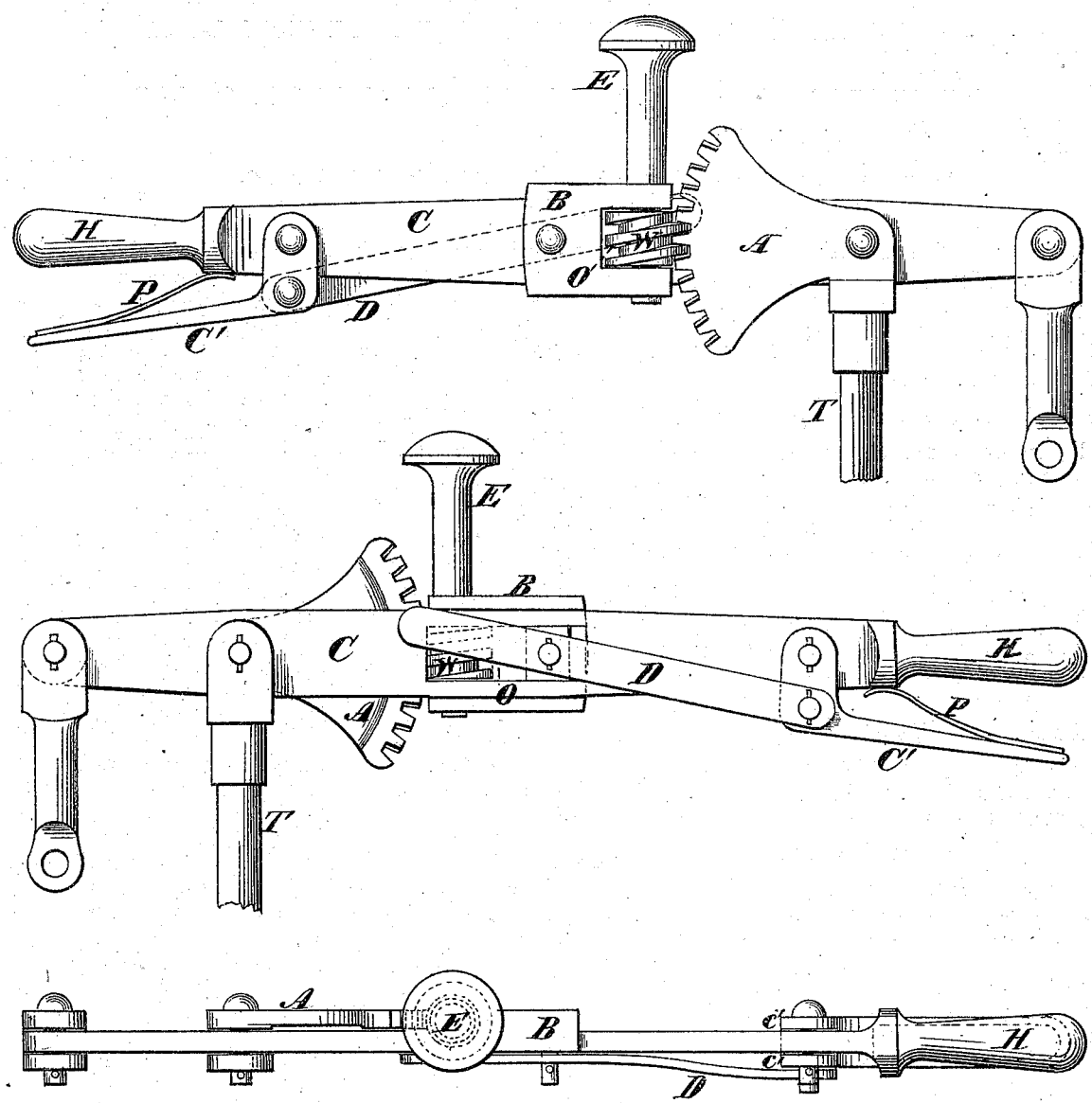

UNITED STATES PATENT OFFICE.

JOHN MILLS, OF NEWFIELD, NEW JERSEY, ASSIGNOR OF ONE-HALF HIS RIGHT TO THOMAS TIMMINS, OF PHILADELPHIA, PENNSYLVANIA.

IMPROVEMENT IN THROTTLE-VALVE LEVERS FOR LOCOMOTIVES.

Specification forming part of Letters Patent No. 124,606, dated March 12, 1872.

SPECIFICATION.

I, JOHN MILLS, of Newfield, in the county of Gloucester and State of New Jersey, have invented certain "Improvements in Throttle-Levers for Locomotive Engines," of which the following is a specification:

Nature and Object of the Invention.

My invention relates to the combination of a worm or screw working in a lever and its supports, whereby I am enabled by turning the worm or screw to regulate the steam without unlocking the lever, and to open the throttle-valve to one-thousandth part of an inch.

My invention is of great importance for coupling up carriages, as it can be instantly placed out of gear, and screwed perfectly tight when the engine is stopped, so as to prevent any escape of steam.

Description of the Accompanying Drawing.

Figure 1 is a front view of my invention. Fig. 2 is a back view of the same. Fig. 3 is a top view of the same.

General Description.

C is an ordinary throttle-lever, in the center of which is formed a rectangular opening, O. Pivoted and working on the lever C is a rack, A, to which is attached the throttle-stem T, working in the opening O, and having its bearings on one side; and on the top and under part of the lever C, is a bracket, B. Attached to said bracket, and gearing with the rack A, is a screw or worm, W, which regulates the opening or closing of the throttle-valve by means of the hand-wheel E. Connected with the bracket B, and extending toward the handle H of the lever C, where it is pivoted to a curved lever, C'. Pivoted to lever C is a rod, D, riveted to the lever C'; and extending up under the handle H is a spring, P.

Operation.

To regulate the amount of steam desired, the hand-wheel E is turned and revolves the worm or screw W, which, gearing with the rack A attached to the throttle-stem T, opens or closes the throttle to one-thousandth part of an inch. The rack A can be immediately placed out of gear when desired by pressing the lever C', which draws on the rod D and bracket B.

Having thus described my invention, what I claim, and desire to secure by Letters Patent, is—

The combination and arrangement of the levers C C', rod D, bracket B, worm or screw W, rack A, throttle-stem T, and spring P, so as to operate substantially as and for the purpose specified.

JOHN MILLS.

Witnesses:
    JAMES A. PEARSON,
    JAMES B. LOVE.